United States Patent
Lux et al.

(10) Patent No.: US 8,308,193 B2
(45) Date of Patent: Nov. 13, 2012

(54) VEHICLE FRAME ASSEMBLY AND METHOD

(75) Inventors: Matthew R. Lux, Dublin, OH (US);
Eric J. Boettcher, Columbus, OH (US);
Robb L. Augustine, Dublin, OH (US);
Martyn L. Morrish, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 12/713,737

(22) Filed: Feb. 26, 2010

(65) Prior Publication Data

US 2011/0210539 A1 Sep. 1, 2011

(51) Int. Cl.
*B62D 21/12* (2006.01)

(52) U.S. Cl. ........ 280/785; 280/796; 280/798; 180/299; 180/312; 296/203.02; 296/203.04; 296/204

(58) Field of Classification Search .................. 280/781, 280/785, 796, 798; 180/299, 312; 296/203.2, 296/203.4, 204, 194, 195, 203.02, 203.04
See application file for complete search history.

(56) References Cited

U.S. PATENT DOCUMENTS

| | | | |
|---|---|---|---|
| 3,105,717 A * | 10/1963 | Schilberg | 296/35.1 |
| 5,228,656 A | 7/1993 | Sauber | |
| 5,409,283 A * | 4/1995 | Ban | 296/35.1 |
| 5,823,287 A * | 10/1998 | Chidamparam et al. | 180/377 |
| 5,899,498 A * | 5/1999 | Horton | 280/781 |
| 6,269,902 B1* | 8/2001 | Miyagawa | 180/312 |
| 6,869,090 B2* | 3/2005 | Tatsumi et al. | 280/124.109 |
| 7,201,398 B1* | 4/2007 | Christofaro et al. | 280/781 |
| 7,275,296 B2 | 10/2007 | DiCesare | |
| 7,380,829 B2* | 6/2008 | Kishima | 280/781 |
| 7,393,015 B1 | 7/2008 | Gillespie et al. | |
| 7,520,514 B2 | 4/2009 | Ogawa et al. | |
| 7,584,815 B2 | 9/2009 | Ogawa et al. | |
| 8,042,862 B2* | 10/2011 | Cox | 296/204 |
| 2004/0200659 A1 | 10/2004 | Miyasaka | |
| 2007/0024044 A1 | 2/2007 | Ogawa et al. | |

* cited by examiner

*Primary Examiner* — Toan To
(74) *Attorney, Agent, or Firm* — Rankin, Hill & Clark LLP

(57) ABSTRACT

A frame assembly for a vehicle includes a subframe, a collar assembly with a collar member and a mounting pin, and a main frame with a saddle. The main frame has a contact side that faces toward the collar assembly and the saddle is located on the contact side. The subframe is connected to the main frame with a bolt that extends from the subframe and into a bore in the mounting pin. The mounting pin is in contact with the saddle.

21 Claims, 5 Drawing Sheets

VEHICLE FRAME ASSEMBLY AND METHOD

BACKGROUND

Exemplary embodiments herein relate to vehicle frame assemblies, and more particularly to a vehicle frame assembly having an in frame subframe mounting structure.

In certain joints of a vehicle's frame structure, stiffness and rigidity are desirable. One position where stiffness is desired is within the connection between the vehicle's main frame and subframe. In some vehicles, all of these parts are connected using a mounting pin that is projection welded to the sub-frame mounting bracket near the bottom of the pin and MIG welded to the box-shaped internal bulkhead at the top of the pin. The box-shaped bulkhead is then welded to the upper part of the frame to complete the structure. Many welds are required to secure the joint.

As the number of welds that are required is increased, there is an increase in the time needed to assemble the frame structure. This results in an increased overall cost of production for the vehicle. Further, the addition of bulkheads to the frame structure results in added weight to the vehicle. This additional weight negatively impacts the vehicle's overall fuel efficiency during operation. Also, with each extra weld, there is a further opportunity for a quality defect to occur. As such, it is beneficial to reduce the number of welds that must be used to construct the frame structure. Further, it is desirable to reduce the number of bulkheads.

BRIEF DESCRIPTION

According to one aspect, a frame assembly for a vehicle includes a subframe forming a front or rear frame subassembly of the vehicle, and a main frame extending longitudinally along the vehicle. The main frame has a contact side with a saddle defined therein. The frame assembly also includes a collar assembly for connecting the subframe to the main frame. The collar assembly has a mounting pin that is complementarily received within the saddle of the main frame.

According to another aspect, a vehicle frame assembly includes a collar assembly that includes a collar member and a cylindrical shaped mounting pin. The collar member has first and second sides that are connected by a base, and the mounting pin has a proximal end, a free distal end, and a curved face extending therebetween. The proximal end of the mounting pin is connected to the base of the collar member and the distal end of the mounting pin is disposed between the first and second sides of the collar member. The vehicle frame assembly also includes a main frame with a contact side that faces toward the collar assembly. The contact side has a saddle that is disposed between first and second connection areas. A portion of the mounting pin is received within the saddle so that the curved face of the mounting pin contacts the saddle of the main frame to improve stiffness between the main frame and the collar assembly. The first and second connection areas are connected to an outer end of the first and second sides, respectively, of the collar assembly.

According to still another aspect, a method of assembling a vehicle frame assembly includes providing a collar assembly that includes a collar member and a cylindrical shaped mounting pin. The collar member has first and second sides that are connected by a base, and the mounting pin has a proximal end, a free distal end, and a curved face extending therebetween. The proximal end of the mounting pin is connected to the base of the collar member and the distal end of the mounting pin is disposed between the first and second sides of the collar member. The method further includes providing a main frame with a contact side. The contact side has first and second connection areas with a saddle disposed therebetween. The method also includes aligning the curved face of the mounting pin with the saddle of the main frame so that the curved face of the mounting pin engages the saddle of the main frame, and connecting an outer end of the first and second sides of the collar assembly to the first and second connection areas, respectively, of the main frame.

DETAILED DESCRIPTION

Figure 1:
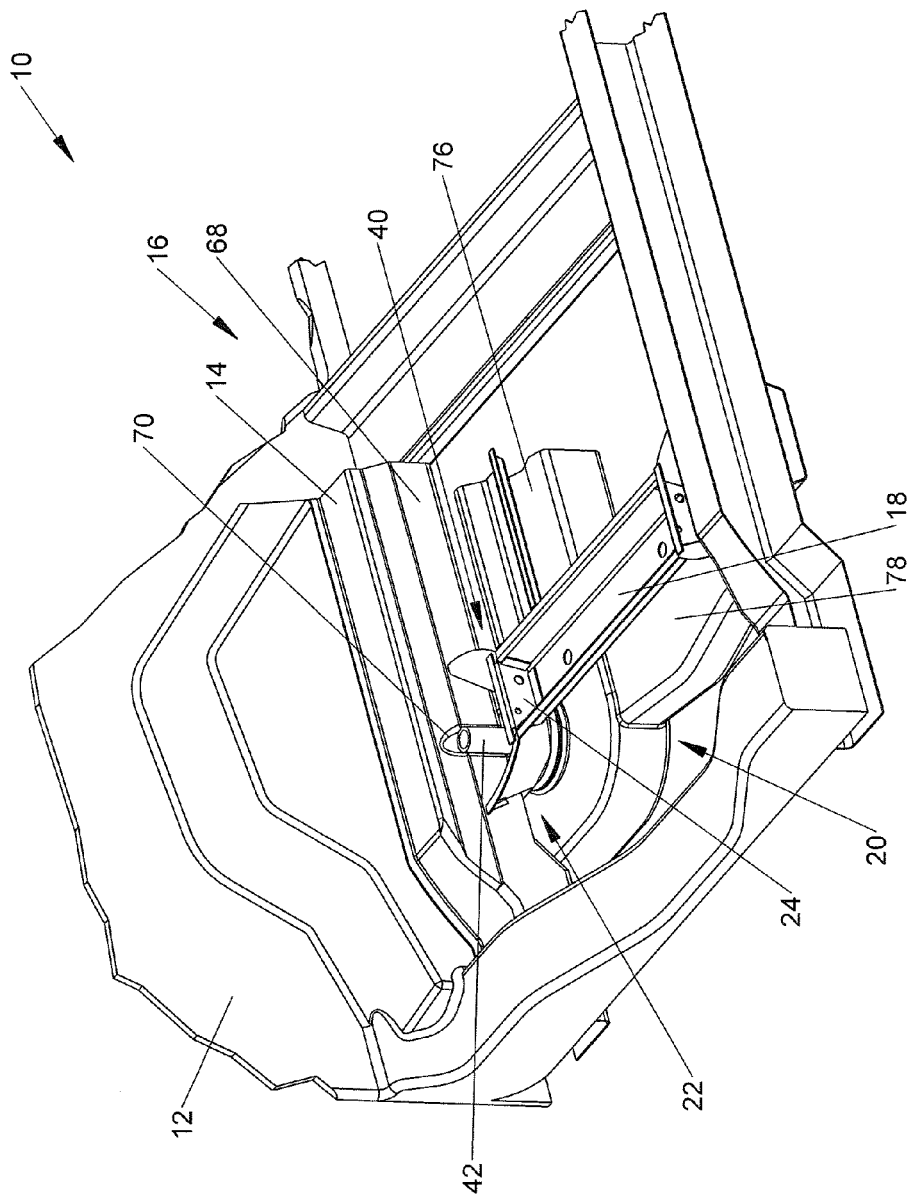
FIG. 1 is a perspective view of a portion of a vehicle frame assembly.

Referring now to the drawings, wherein they are for purposes of illustrating one or more exemplary embodiments and not for purposes of limiting same, FIG. 1 illustrates a vehicle frame assembly 10 having a vehicle body 12 attached thereto. As shown in FIGS. 1-4, the vehicle frame assembly 10 includes a frame rail 14 of a main frame 16, the frame rail 14 extending longitudinally along a vehicle on which the frame assembly 10 is employed, a cross member 18 extending laterally across the vehicle, a subframe 20 (e.g., a front or rear subframe), and a collar assembly 22 for connecting the cross member 18 and the subframe 20 to the main frame 16. The frame assembly 10 can additionally include a reinforcement member 24 with a welding tab 26 and holes 28 for connecting the cross member 18 to the collar assembly 22 and a bolt 30 for connecting the subframe 20 to the collar assembly 22. As used herein, longitudinal is used in reference to the longitudinal length of the vehicle and lateral is used in reference to a lateral width of the vehicle, unless otherwise specified.

In the illustrated embodiment, the cross member 18 includes flanges 32, a first side wall 34, a second side wall 36, and a bottom wall 38. The collar assembly 22 includes a collar member 40 and a mounting pin 42 received within the collar member 40. The collar member 40 has a base 44 defining an aperture 46 (FIG. 4) with a boss 48, first and second sides 50, 52 extending upward from opposite longitudinal ends of the base 44 (i.e., longitudinal relative to a vehicle direction of travel), and flanges 54 extending outwardly from distal ends of the first and second sides 50, 52. The collar member 40 has an inner lateral end 56 and an outer lateral end 58. The mounting pin 42 has a proximal end 60, a distal end 62, a curved face 64, and a bore 66. The frame rail 14 of the main frame 16 includes a contact side 68. The contact side 68 has a recess or saddle 70 defined therein, a first connection area 72 connected to the first side 50 of the collar assembly 22, and a second connection area 74 connected to the second side 52 of the collar assembly 22.

Referring to the cross member 18, the first side wall 34, the second side wall 36, and the bottom wall 38 cooperate to define a U-shape for the cross member 18. The first side wall 34 and the second side wall 36 may be generally parallel to one another as they extend from the bottom wall 38 to terminate into the respective flanges 32. Alternatively, the first side wall 34 and the second side wall 36 may extend toward or away (as shown in the illustrated embodiment) from one another as they rise from the bottom wall 38 toward the respective flanges 32. The flange 32 of the first side wall 34 and the flange 32 of the second side wall 34 each extend in a direction that is generally parallel to the bottom wall 38. The flanges 32 may be used to help connect the cross member 18 and the collar assembly 22, as will be discussed hereinbelow, and/or may provide support for an overlaying floor panel (not shown).

The first and second sides 50, 52 of the collar assembly 22 are connected by the base 44. As shown in the illustrated embodiment, the base 44 may be of a semi-circular planar shape, though other configurations could be used. The boss 48 of the mounting pin 42 rests against the upper side of the base 44 adjacent a portion of the base 44 that defines the aperture 46. The first and the second sides 50, 52 each extend from the base 44 and terminate in their respective flange 54. The first and the second sides 50, 52 each have a curved shape that laterally extends from respective connections with the first wall and the second wall of the cross member 18 to the first and second connection areas 72, 74, respectively, of the frame rail 14 of the main frame 16.

At the inner lateral end 56 of the collar assembly 22, the first and second sides 50, 52 define the area where the collar assembly 22 is connected to the cross member 18. Likewise, at the outer lateral end 58, the first and second sides 50, 52 define the area where the collar assembly 22 is connected to the frame rail 14 of the main frame 16. The flanges 54 of the collar assembly 22 may be connected to the flanges 32 of the cross member 18, which may increase rigidity of the frame assembly 10.

Figure 2:
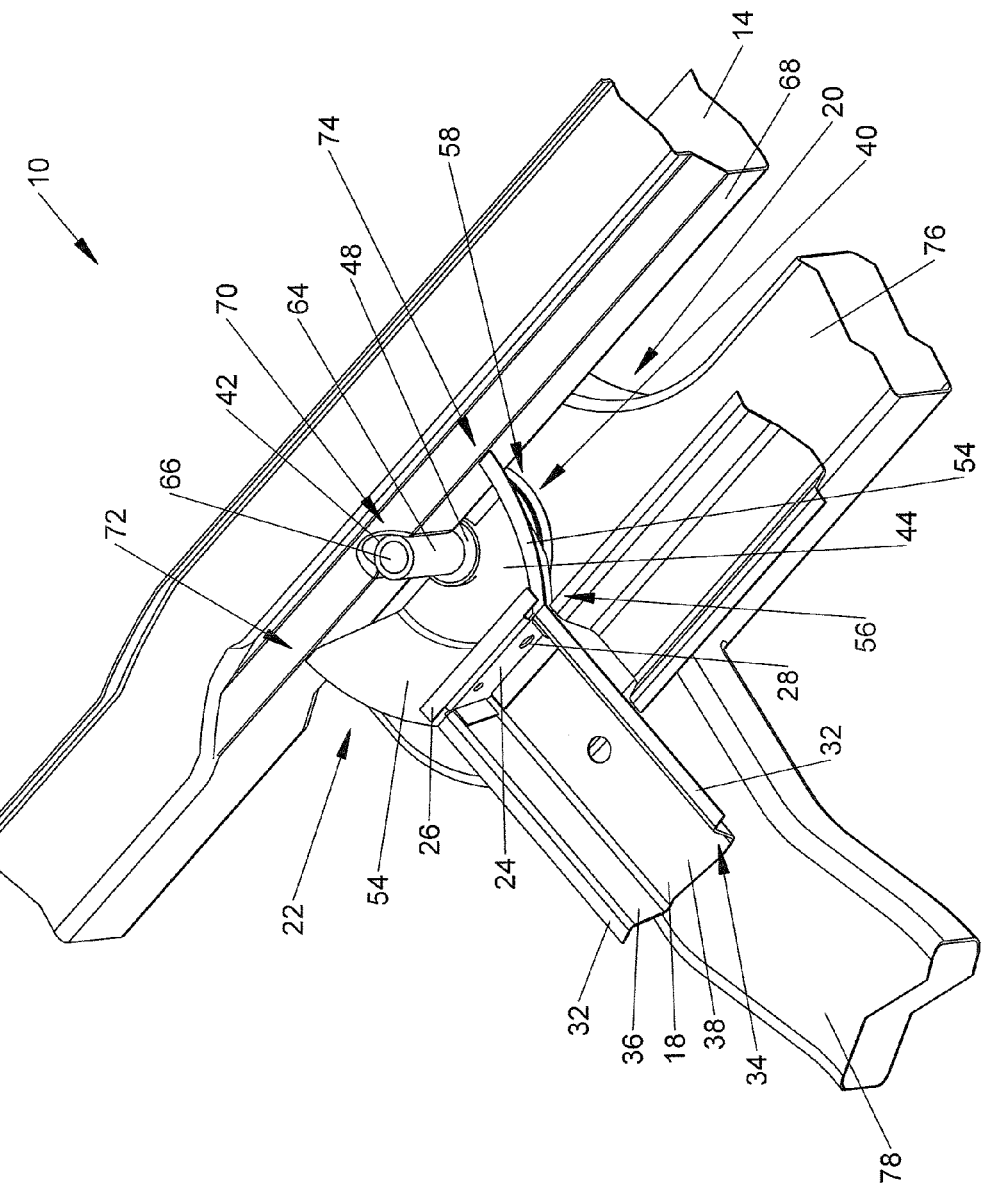
FIG. 2 is a partial perspective view of the vehicle frame assembly of FIG. 1.
Figure 3:
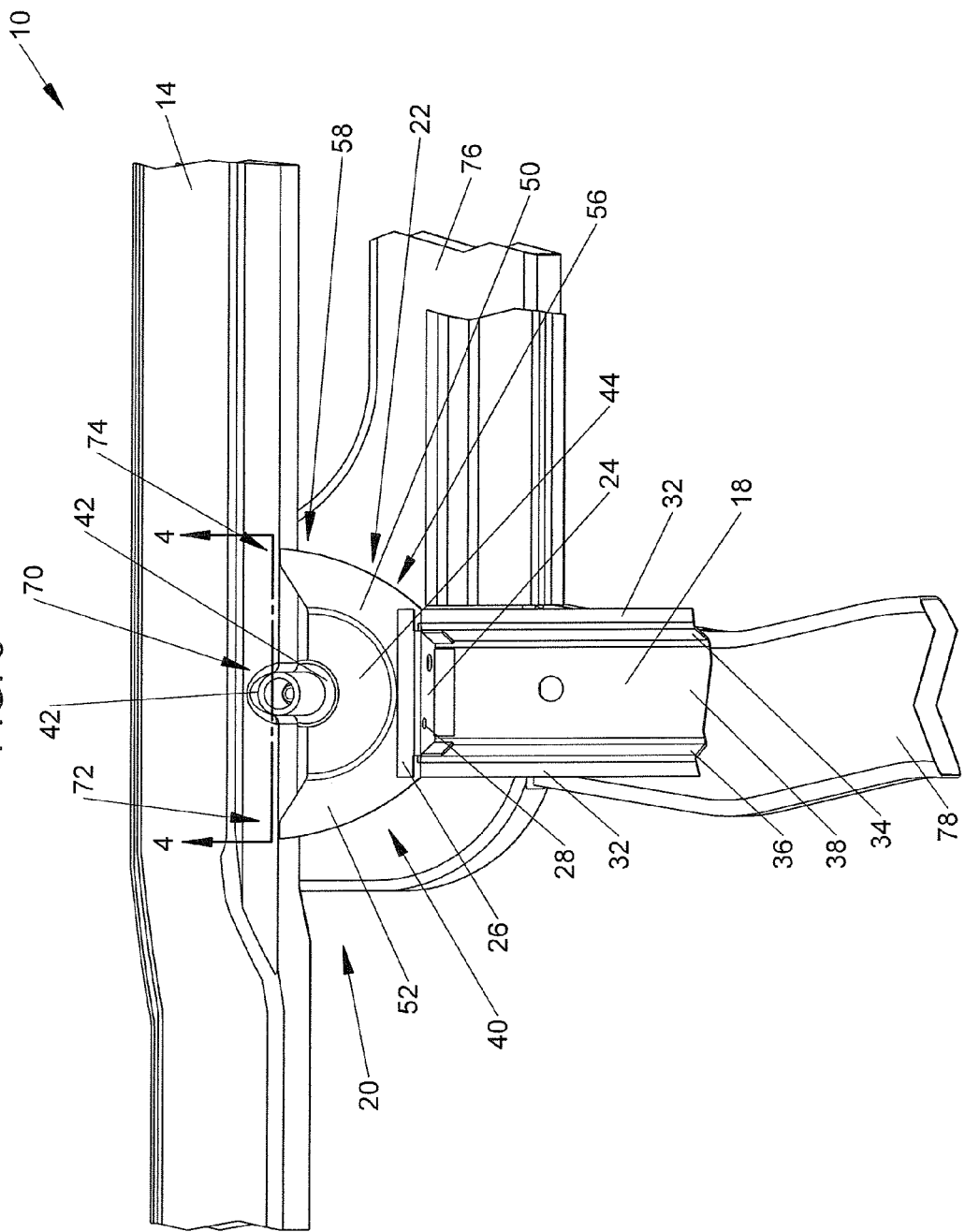
FIG. 3 is a partial plan view of the vehicle frame assembly of FIG. 1.
Figure 4:
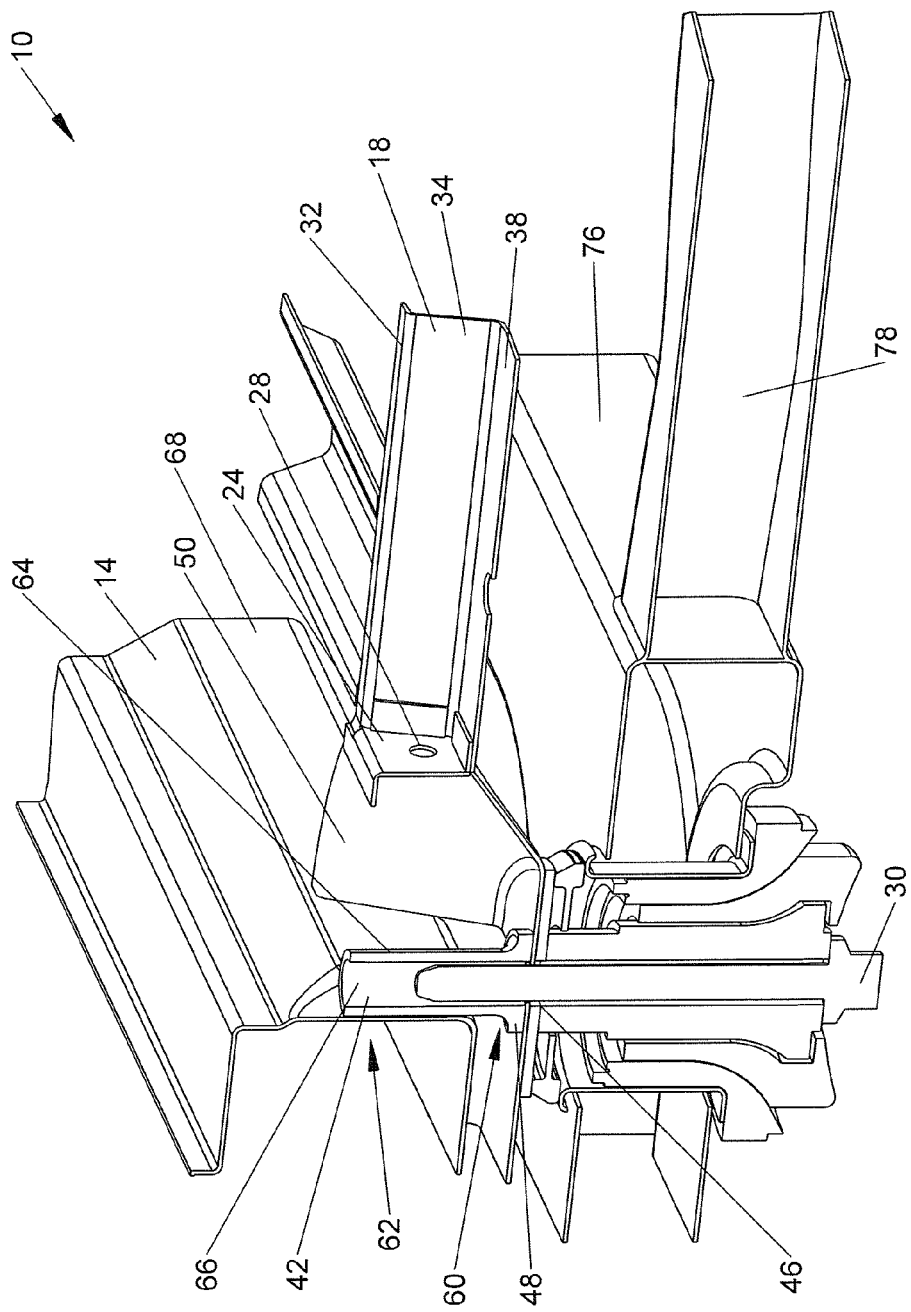
FIG. 4 is a partial sectional view of the vehicle frame assembly taken along line 4-4 of FIG. 3.

The mounting pin 42 extends upward from the base 44 with the proximal end 60 being connected to the base 44 and the free distal end 62 being disposed in an area that is longitudinally between the first side 50 and the second side 52. The curved face 64 of the mounting pin 42 is situated between the proximal end 60 and the distal end 62. As shown in FIG. 3, the curved face 64 of the mounting pin 42 defines a generally circular cross-section shape of the mounting pin 42. However, it is understood that other cross-sectional shapes of the mounting pin 42 are possible and contemplated. The cross-sectional shape of the mounting pin 42 may be complementary to the saddle 70. In particular, the mounting pin 42 and the saddle 70 may have adjacent surfaces that conform to one another, such as being of the same shape or curvature. As shown by FIGS. 1-3, the mounting pin 42 of the collar assembly 22 is mounted into the saddle 70, which is a contoured shape that is stamped into the frame rail 14 of the main frame 16. By mounting the collar assembly 22 directly to the main frame 16, the need for additional bulkheads is reduced and a high level of stiffness is attained. Thus, the collar assembly 22 can be directly welded to the frame rail 14 of the main frame 16 and provides a rigid assembly.

The bore 66 coaxially extends within the mounting pin 42 from the proximal end 60 toward the free distal end 62. The bore 66 may extend all the way to the distal end 62 resulting in the mounting pin 42 having a hollow or sleeve type construction. Alternatively, the bore 66 of the mounting pin 42 may terminate at a location somewhere between the proximal end 60 and the distal end 62 of the mounting pin 42, thereby defining a blind bore. Further, though not illustrated, the bore 66 or a portion thereof may be threaded.

As shown, the bore 66 of the mounting pin 42 is aligned or in registry with the aperture 46 of the base 44 so as to allow for receipt of a fastener, such as the bolt 30, from an underside of the collar member 40, particularly the base 44 thereof. Further, the boss 48 annularly surrounds the mounting pin 42 at the proximal end 60, thereby strengthening the connection between the mounting pin 42 and the base 44. Although the boss 48 is illustrated as being part of the mounting pin 42, it is understood that the boss 48 may be a separate component or part of the base 44 or may be eliminated.

The frame rail 14 of the main frame 16 can be of a closed form construction and has the vehicle body 12 attached thereto. The contact side 68 of the frame rail 14 of the main frame 16 faces toward the collar member 40 and away from the vehicle body 12 (i.e., laterally inwardly). The saddle 70 is defined by the contact side 68. The saddle 70 of the illustrated embodiment is a curved surface that is recessed from, and flanked by, the first connection area 72 and the second connection area 74. The first connection area 72 and the second connection area 74 of the frame rail 14 of the main frame 16 are connected to the first side 50 and the second side 52, respectively, of the collar member 40 of the collar assembly 22. The curved face 64 of the mounting pin 42 can engage the saddle 70 of the frame rail 14 of the main frame 16 such that a portion of the mounting pin 42 is received within the saddle 70. By this arrangement, the saddle 70 surrounds a portion of the mounting pin 42.

The reinforcement member 24 can be disposed between the first side wall 34 and the second side wall 36 of the cross member 18. The holes 28 in the reinforcement member 24 allow for access within the collar assembly 22. The welding tab 26 of the reinforcement member 24 may be connected to the flanges 54 of the collar member 40 of the collar assembly 22 to increase rigidity of the frame assembly 10. The reinforcement member 24, the contact side 68 of the frame rail 14 of the main frame 16, the first side 50 of the collar assembly 22, and the second side 52 of the collar assembly 22 cooperate to encircle the mounting pin 42. In alternate frame assemblies, the reinforcement member 24 could be eliminated, configured differently or replaced by one or more other types of reinforcement members that would attach to the collar member 40 of the collar assembly 22.

The subframe 20, if forming a rear frame subassembly of the vehicle, can be formed in various lengths to accommodate elongated beds of varying lengths and/or elongated rear passenger compartments of varying lengths, though this is not required. The subframe 20, if forming a front frame subassembly of the vehicle, can be also formed in various sizes to support drivetrain components. As shown in FIG. 2, the subframe 20 includes a side member 76 and a cross brace 78 extending therefrom in a generally perpendicular direction. Although not shown, it is understood that an additional side member is spaced from the illustrated side member 76 and longitudinally extends in a direction parallel to the illustrated side member 76, so that the cross brace 78 extends therebetween. Further, the cross brace 78 may define a support for front or rear wheels and front or rear suspension (also not shown).

The subframe 20, or at least a portion that connects to the main frame 16, is located in an area beneath the collar assembly 22. The bolt 30 from the subframe 20 extends toward the collar assembly 22 and through the aperture 46 of the base 44. Further, the bolt 30 can be threadedly received within the mounting pin 42, such as when the bore 66 is threaded or includes a threaded region. While the bolt 30 and the mounting pin 42 can be threadedly engaged to one another, it is to be understood that other means of fastening the bolt 30 of the subframe 20 to the bore 66 of the mounting pin 42 are contemplated and possible. While not limiting, it is envisioned that the bolt 30 could extend within the mounting pin 42 and be affixed by other means, such as adhesives or other fixing agents to the mounting pin 42, a rivet-type connection, etc.

Additionally, other connection means and/or devices could be used for connecting the subframe 20 to the mounting pin 42 and/or the main frame 16.

Figure 5:
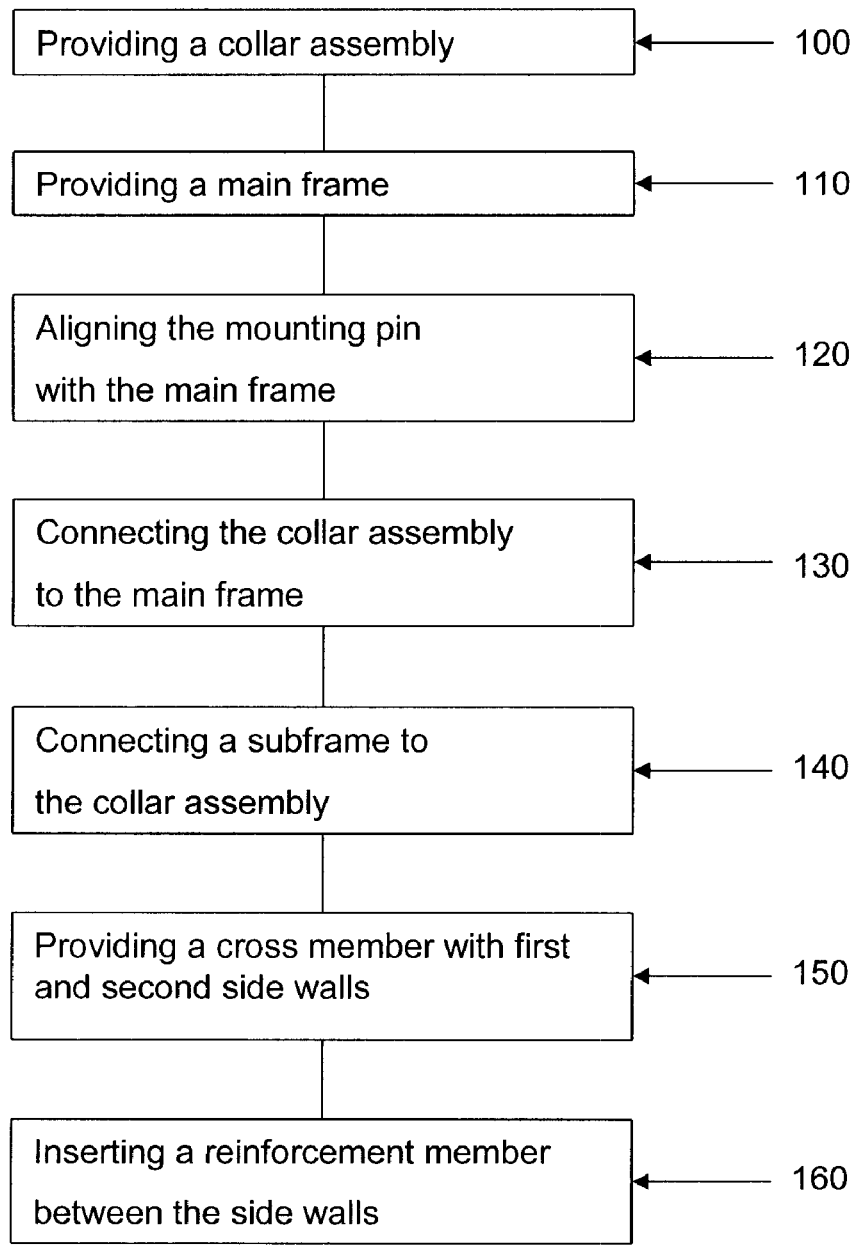
FIG. 5 is a flowchart of a method of assembling a vehicle frame assembly, such as the vehicle frame assembly of FIG. 1.

With reference to FIG. 5, a method of assembling a vehicle frame assembly 10, such as a vehicle frame of the illustrated embodiment, will now be discussed. In 100, a collar assembly 22 that includes a collar member 40 and a cylindrical shaped mounting pin 42 is provided. The collar member 40 has first and second sides that are connected by a base 44, and the mounting pin 42 has a proximal end 60, a free distal end 62, and a curved face 64 extending therebetween. The proximal end 60 of the mounting pin 42 is connected to the base 44 of the collar member 40 and the distal end 62 of the mounting pin 42 being disposed between the first and second sides 50, 52 of the collar member 40. In 110, a main frame 16 with a contact side 68 is provided. The contact side 68 has first and second connection areas 72, 74 with a saddle 70 disposed therebetween. In 120, the curved face 64 of the mounting pin 42 is aligned with the saddle 70 of the main frame 16 so that the curved face 64 of the mounting pin 42 engages the saddle 70 of the main frame 16. In 130, an outer end 58 of the first and second sides 50, 52 of the collar assembly 22 is connected to the first and second connection areas 72, 74, respectively, of the main frame 16. In 140, a subframe 20 is connected to the collar assembly 22 by extending a bolt 30 from the subframe 20 through the base 44 to threadingly terminate within a bore 66 of the mounting pin 42. In 150, a cross member 18 with first and second side walls 34, 36 that are connected by a bottom wall 38, is provided. In 160, a reinforcement member 24 is inserted between the first and second side walls 34, 36.

It will be appreciated that the above-disclosed and other features and functions, or alternatives or varieties thereof, may be desirably combined into many other different systems or applications. Also presently unforeseen or unanticipated alternatives, modifications, variations or improvements therein may be subsequently made by those skilled in the art which are also intended to be encompassed by the following claims.

The invention claimed is:

1. A frame assembly for a vehicle, comprising:
    a subframe forming a front or rear frame subassembly of the vehicle;
    a main frame extending longitudinally along the vehicle, said main frame having a contact side with a saddle defined therein; and
    a collar assembly for connecting the subframe to the main frame, said collar assembly including a mounting pin that is complementarily received within said saddle of said main frame,
    wherein the mounting pin includes a bore that coaxially extends within the mounting pin, the subframe being connected to the collar assembly with a fastener that extends from the subframe and is received within the bore of the mounting pin.

2. The frame assembly for a vehicle of claim 1, wherein the collar assembly further includes a collar member with first and second sides that are connected by a base, and wherein the mounting pin extends from the base and up between the first and second sides.

3. The frame assembly for a vehicle of claim 2, further comprising:
    a cross member with first and second side walls that are connected by a bottom wall.

4. The frame assembly for a vehicle of claim 3, wherein the first and second sides of the collar assembly are connected to the first and second side walls, respectively, of the cross member.

5. The frame assembly for a vehicle of claim 3, further comprising:
    a reinforcement member that extends between the first side wall, the second side wall, and the bottom wall of the cross member.

6. The frame assembly for a vehicle of claim 5, wherein the reinforcement member includes a welding tab for attachment to the cross member.

7. The frame assembly for a vehicle of claim 5, wherein the reinforcement member, the first side of the collar assembly, the second side of the collar assembly, and the contact side of the main frame cooperate to encircle the mounting pin.

8. The frame assembly for a vehicle of claim 2, wherein the contact side of the main frame faces toward the collar assembly and the saddle is disposed between first and second connection areas of the contact side, and wherein the first and second connection areas of the contact side are connected to the first and second sides, respectively, of the collar assembly.

9. A vehicle frame assembly, comprising:
    a collar assembly that includes a collar member and a cylindrical shaped mounting pin, the collar member having first and second sides that are connected by a base, and the mounting pin having a proximal end, a free distal end, and a curved face extending therebetween, the proximal end of the mounting pin being connected to the base of the collar member and the distal end of the mounting pin being disposed between the first and second sides of the collar member; and
    a main frame with a contact side that faces toward the collar assembly, the contact side having a saddle that is disposed between first and second connection areas, wherein a portion of the mounting pin is received within the saddle so that the curved face of the mounting pin contacts the saddle of the main frame to improve stiffness between the main frame and the collar assembly, and wherein the first and second connection areas are connected to an outer end of the first and second sides, respectively, of the collar assembly.

10. The vehicle frame assembly of claim 9, further comprising:
    a cross member with first and second side walls that are connected by a bottom wall, wherein the first and second sides of the collar assembly have an inner end that is connected to the first and second side walls, respectively, of the cross member.

11. The vehicle frame assembly of claim 9, wherein the mounting pin further includes a boss for attachment of the mounting pin to the base.

12. The vehicle frame assembly of claim 9, wherein the mounting pin includes a bore that coaxially extends within the mounting pin.

13. The vehicle frame assembly of claim 12, wherein a subframe is connected to the collar assembly with a threaded bolt, and the threaded bolt extends from the subframe, through an aperture of the base, and terminates in threaded engagement within the bore of the mounting pin.

14. The vehicle frame assembly of claim 10, further comprising:
    a reinforcement member that extends between the first side wall, the second side wall, and the bottom wall of the cross member.

15. The vehicle frame assembly of claim 14, wherein the reinforcement member includes a welding tab for attachment to the cross member.

16. The vehicle frame assembly of claim 14, wherein the reinforcement member, the first side of the collar assembly, the second side of the collar assembly, and the contact side of the main frame cooperate to encircle the mounting pin.

17. A method of assembling a vehicle frame assembly, comprising:
providing a collar assembly that includes a collar member and a cylindrical shaped mounting pin, the collar member having first and second sides that are connected by a base, and the mounting pin having a proximal end, a free distal end, and a curved face extending therebetween, the proximal end of the mounting pin being connected to the base of the collar member and the distal end of the mounting pin being disposed between the first and second sides of the collar member;
providing a main frame with a contact side, the contact side having first and second connection areas with a saddle disposed therebetween;
aligning the curved face of the mounting pin with the saddle of the main frame so that the curved face of the mounting pin engages the saddle of the main frame; and
connecting an outer end of the first and second sides of the collar assembly to the first and second connection areas, respectively, of the main frame.

18. The method of assembling the vehicle frame assembly of claim 17, further comprising:
connecting a subframe to the collar assembly by extending a bolt from the subframe through the base to threadingly terminate within a bore of the mounting pin.

19. The method of assembling the vehicle frame assembly of claim 17, further comprising:
providing a cross member with first and second side walls that are connected by a bottom wall; and
inserting a reinforcement member between the first and second side walls.

20. A frame assembly for a vehicle, comprising:
a subframe forming a front or rear frame subassembly of the vehicle;
a main frame extending longitudinally along the vehicle, said main frame having a contact side with a saddle defined therein; and
a collar assembly for connecting the subframe to the main frame, said collar assembly including a mounting pin that is complementarily received within said saddle of said main frame,
wherein the collar assembly further includes a collar member with first and second sides that are connected by a base, and wherein the mounting pin extends from the base and up between the first and second sides, and further including a cross member with first and second side walls that are connected by a bottom wall.

21. A frame assembly for a vehicle, comprising:
a subframe forming a front or rear frame subassembly of the vehicle;
a main frame extending longitudinally along the vehicle, said main frame having a contact side with a saddle defined therein; and
a collar assembly for connecting the subframe to the main frame, said collar assembly including a mounting pin that is complementarily received within said saddle of said main frame,
wherein the collar assembly further includes a collar member with first and second sides that are connected by a base, and wherein the mounting pin extends from the base and up between the first and second sides, and
wherein the contact side of the main frame faces toward the collar assembly and the saddle is disposed between first and second connection areas of the contact side, and wherein the first and second connection areas of the contact side are connected to the first and second sides, respectively, of the collar assembly.

* * * * *